United States Patent [19]

Cskiós et al.

[11] 4,214,032
[45] Jul. 22, 1980

[54] INSULATING FELTS REINFORCED BY FIBROUS MATERIALS PARTICULARLY FOR THE WATERPROOFING AND/OR CORROSION-PROOFING OF METAL AND/OR CONCRETE OBJECTS

[75] Inventors: Rezsö Csikós, András Balogh, both of Veszprém, Jösef Herendi, Balatonal Mädi, Péter L. Farkas, Veszprém, János Reményi, Veszprém, Sándor Koltay, Veszprém, all of Hungary

[73] Assignee: Magyar Ásványolaj és Fööldgáz Kisérleti Intézet, Veszprém, Hungary

[21] Appl. No.: 796,885

[22] Filed: May 16, 1977

[30] Foreign Application Priority Data

May 19, 1976 [HU] Hungary ............................ MA 2775

[51] Int. Cl.² ..................... B32B 11/02; B32B 11/10; D06N 5/00

[52] U.S. Cl. ................................... 428/280; 428/489
[58] Field of Search ................... 428/280, 281, 489

[56] References Cited

U.S. PATENT DOCUMENTS

| 2,590,032 | 3/1952 | Petry ............................. 428/280 |
| 4,055,453 | 10/1977 | Tajima et al. ................. 428/291 |

FOREIGN PATENT DOCUMENTS

2523796  1/1976  Fed. Rep. of Germany.

*Primary Examiner*—J. C. Cannon

[57] ABSTRACT

The insulating felt comprises 23 to 39% by weight of pyrolytic resin, 35 to 54% by weight of asphalt, 4 to 7% by weight of softener, 2.5 to 8% by weight plasticizer, 2 to 4% by weight of fine grained material and 10 to 25% by weight of reinforcing material. The felt is useful for water proofing or preventing corrosion of metal and concrete objects.

6 Claims, No Drawings

INSULATING FELTS REINFORCED BY FIBROUS MATERIALS PARTICULARLY FOR THE WATERPROOFING AND/OR CORROSION-PROOFING OF METAL AND/OR CONCRETE OBJECTS

The present invention relates to an insulating felt reinforced by a fibrous material, in which as insulators polycondensed hydrocarbons of petrological origin and asphalts for the softening thereof are used. Plasticity is ensured by the addition of various synthetic materials.

There are various products known in the art, in which a plastic material is adhered to the top of a supporting plate by asphalts (i.e. wall-paper), and which contain vinylpolymers, softeners and a fibrous loading material (see for example: U.S. Pat. No. 2,590,032). However, these products comprise the loading material in a quantity of at least 50% and have a low flexibility characterized by the longitudinal breaking expansion. Therefore, they are suitable only for covering inner walls.

Moreover, there have been reported compositions for roof insulation which comprise a fibrous loading material, asphalt and a synthetic material containing chlorine, which are suitable for the impregnation of woven textiles and other cloths of similar structure. The products, obtained in this way, however, do not have a self-supported structure, and the asphalt serves merely as a cement. These compositions can contain at most 15% synthetic material containing chlorine.

The insulating felt according to the invention comprises 23 to 39% by weight pyrolytic resin, 35 to 54% by weight asphalt, 4 to 7% by weight softener, 2.5 to 8% by weight plasticizer, 2 to 4% by weight fine-grained material and 20% by weight reinforcing material.

The compositions disclosed in this invention show a permanent flexibility, a surprisingly high longitudinal breaking expansion, and, due to the low migration speed of the softener and to the small extent of the migration, they possess favorable flexibility and adhesive properties. At most 25% by weight of fibrous loading material is employed. This is considerably less than the amount used in similar compositions known in the art.

The insulating materials used for roofing, structural engineering and for the insulation of pipelines should be first of all suitable for waterproofing and corrosion-proofing (including the corroding effect of the soil bacteria), and besides should have favourable lasting qualities.

The various known insulating asphalts and asphalt compositions generally can not resist the harmful effect of the soil bacteria and fungi, the extent of which strongly depends on the quality of the soil.

Another drawback of the known asphalts used without a cross-linked reinforcement is that they flow. The extent of such flow depends on the temperature. They flow especially when used vertically; however, flow will start even when they are employed at a small slope. The phenomenon of flow is very disadvantageous because as a result of it the asphalts lose their insulating character.

In the compositions of the present invention, various textiles spun of synthetic fibers, textile glasses, woven textiles or jute cloths are used as reinforcing material. When jute cloth is employed, possible damages to the jute and cotton fibers should be taken into consideration.

When employing textile glass, the fineness of the glass fibers is at least 0.2 mm. and the space among the fibers is at most 4 mm$^2$. This allows the insulating mass to penetrate into the space among the fibers and fill it in. The glass fibers should be qualified taking into consideration also the adhesion and the possible age hardening of the fibers.

In case of textiles woven from synthetic fibers the use of various polymer fibers was found to be the most advantageous. Polypropylene has monoaxial properties and becomes biaxial as a consequence of weaving. The fineness of the polymer fiber is 0.1 to 0.2 mm. and the space among the fibers is 3 to 4 mm$^2$.

A very important advantage of the use of polymer fibers is that the fibers undergo shrinking under the influence of heat, and the elastic substances serving as insulators jam in the space among the fibers as a consequence of the contraction. This will occur if the temperature is kept for example in case of polypropylene, at 80° to 120° C. preferably at 100° C.

For the preparation of the plastic materials ensuring the isolation there are used polycondensed compounds of high molar weight, which can be obtained from the fraction having a boiling point above 180° C. of the pyrolytic tars formed during the pyrolysis of petrol, according to the process of the Hungarian Pat. No. MA-2577. According to this process the components liable to polymerization are subjected to oxidation. In accordance with such process a condensed aromatic hydrocarbon fraction and a pyrolytic heavy resin fraction are produced from a starting material of by-products boiling above 180 degrees C. produced in the pyrolytic decomposition of hydrocarbons. The starting material is preheated to a temperature of 170 to 220 degrees C. Each unit by weight of the preheated starting material is then oxidized for from $\frac{1}{2}$ to 10 hours at a temperature of 180 to 300 degrees C. with 0.05 to 1.5 units by weight per hour of air. As the oxidation proceeds, the aromatic hydrocarbon fraction is continuously or batchwise separated from the pyrolytic heavy resin fraction by carrier-gas distillation with the air.

The pyrolytic resin has the following characteristics:

| | | |
|---|---|---|
| Softening point, ring-ball, degrees C. | | 90 |
| Density, $d_4^{20}$ | 1.1779 | |
| Molecular weight (average) | 450 | |
| Viscosity at 94 degrees C., cP | $1.77 \times 10^6$ | |
| Elemental Composition: | C% | 93.8 |
| | H% | 6.2 |
| | S% | 0 |
| | O% | 0 |
| Proton Distribution | $^n$Ar—H | 15 |
| | $^n$Ar—OH$_x$ | 4 |
| | $^n$R—CH$_2$—R | 1 |
| | $^n$C | 6 |

The advantages of the process manifest themselves in that under the process conditions employed the unstable unsaturated compounds will polymerize, becoming components of the pyrolytic heavy resin, while the non-polymerized stable aromatic compounds become part of the oxidation fraction through carrier gas distillation.

As used in the present specification and in the claims that follow, the term pyrolytic resin refers to the pyrolytic resins having the above mentioned characteristics and produced in accordance with the above described process.

We have surprisingly found that the resistance of the covering and insulating compositions, prepared using asphalt, natural and synthetic caoutchouc and other ingredients, against agressive chemicals, i.e. acids and bases, adhesive chemicals and water-absorption is considerably improved by the pyrolytic heavy resins.

The insulating composition according to this invention comprises the mixture of asphalt and pyrolytic heavy resin, and thus combines the good corrosion-proofing quality of the two materials and provides a system compatible with natural and synthetic caoutchouc as well.

The compositions of this invention possess outstanding properties. They are stable to agressive chemicals, have small water-absorbing capacity and high elasticity.

Protective coatings formed from the pyrolytic heavy resin obtained when the pyrolytic oil formed during the cracking of hydrocarbon is stabilized according to the method disclosed in Hungarian Pat. No. MA-2577 have been found to have a passivating effect on the surface of carbon steel in addition to a corrosion-proofing effect. In contrast to asphalt, these coatings are stable to mineral oil products of paraffinic character (for example). The pyrolytic heavy resin does not contain water-soluble components, has a much lower ash-content than the asphalts, and thus possesses a considerably lower water-absorbing capacity. The pyrolytic heavy resin has an aromaic structure, consequently the molecules thereof are closer fitted than those of the paraffinous asphalt, and compared to the asphalt, it is more rigid, hard and less resistent to mechanical action.

The compositions disclosed in this invention combine the favorable physical and chemical properties of the pyrolytic heavy resin and the asphalt.

It has been found that the admixture of the two, chemically different substances in liquid phase, over the softening point, preferably at 70° to 100° C. results, in an essential structural change in the asphalt and heavy resin as well. This leads to the formation of a homogeneous mixture, the physical and chemical characteristics of which are different from these of the two components.

The quantity of the obtained mixture strongly depends on the ratio of the pyrolytic heavy resin to the asphalt. Simultaneously with increase of the aggregative stability of the components of the asphalt, the aggregative stability of the strongly condensed parts of the pyrolytic heavy resin, which have high molecular weight, decreases. If the quantity of the pyrolytic heavy resin exceeds 60 to 70% by weight, the softening point of the mixture changes and the mixture becomes rigid. On the other hand, if the pyrolytic heavy resin amounts to 40 to 65% of the total weight, the mixture becomes granular and loompy. Consequently, the quantity of the resin should not exceed this limit. The upper limit of the suitable pyrolytic heavy resin concentration shows a definite increase with asphalts of paraffineous, naphthene and aromatic basis.

In our compositions, distilled, blown, or extracted asphalts having a softening point of 40° to 120° C., preferably 80°–120° C., are used. As pyrolytic heavy resin, a resin prepared according to Hungarian Pat. No. MA-2577 is used. The starting material used in the preparation of such resin is the pyrolytic oil formed during the pyrolysis of hydrocarbons, preferably the pyrolysis of petrol fractions. As described above, the resin should have a softening point between 40° and 90° C., preferably between 60° and 90° C.

It is advisable to combine hard (high softening point) bitumens having high asphaltene content with soft (low softening point) pyrolytic heavy resin.

Preferably the mixture also contains 5 to 15% by weight liquid softener.

The insulating (covering) felt of this invention also comprises a plasticizer, such as a synthetic or natural caoutchouc, in an amount compatible with the other ingredients.

In order to achieve a required plasticity, the addition of a suitable polymer, such as for example, neoprene, chloroprene, or butylcaoutchouc, is unavoidable. The quantity of this component is 1 to 10% by weight.

The fixing on and among the fibers can be promoted by the addition of resin fractions, or by employing polymeric or natural resins in a quantity of 1 to 10% by weight.

The surface flow is decreased by a fine-grained material having a grain-size of 100 to 200$\mu$, e.g. by clay, talc or aluminum oxide. Quantity: 2 to 4% by weight related to the total mixture.

The following Examples illustrate the compositions of this invention. They are not intended to limit the scope of the invention.

EXAMPLE 1

23 parts by weight of a resin containing polycondensed hydrocarbons are admixed with 54 parts by weight of an oxidized asphalt, and the resultant mixture is homogenized. The two components are melted under continuous stirring until the required homogeneity is achieved. The mixture is then cooled to 85° C., and 4 parts by weight of an ester type or secondary softener, and 4 parts by weight of a polymer are added under stirring. The homogeneous mixture is heated up to 105° C. and the reinforcing material (15 parts by weight) is saturated at this temperature.

EXAMPLE 2

Following the method described in Example 1, a product of the following composition is prepared: 39% by weight polycondensed hydrocarbon, 35% by weight asphalt, 7% by weight softener, which can be of ester type prepared with phthalic acid and/or a secondary softener, 2.4% by weight polymer material, 2% by weight talc and 20% by weight reinforcing material.

EXAMPLE 3

Following the method described in Example 1, a product of the following composition is obtained: 23% by weight polycondensed hydrocarbon, 46% by weight asphalt, 4% by weight softener of ester type prepared with phthalic acid or a secondary softener, 8% by weight synthetic caoutchouc and 4% by weight talc, and the composition is applied to 20% by weight textile glass.

What we claim is:

1. In an insulating felt for waterproofing and/or corrosion-proofing metal and concrete objects, said insulating felt comprising asphalt, a softener, a plasticizer, fine-grained material and a reinforcing material wherein the improvement comprises the felt additionally contains a pyrolytic resin, the pyrolytic resin and the asphalt when admixed in liquid phase, at a temperature over the softening point, producing a homogeneous mixture of the asphalt and the pyrolytic resin, said pyrolytic resin being present in an amount by weight of 23 to 39%, said asphalt being present in an amount of from 35 to 54% by weight, said softener being present in an amount of from 4 to 7% by weight, said plasticizer being present in an amount of from 2.5 to 8% by weight, said fine-grained material being present in an amount of from 2 to 4% by weight and said reinforcing material being present in an amount of from 10 to 25% by weight.

2. The insulating felt, according to claim 1, wherein said plasticizer is selected from the group consisting of natural caoutchouc, synthetic rubber, polymers and mixtures thereof.

3. The insulating felt, according to claim 1, wherein said asphalt has a softening point of 80 degrees to 120 degrees C. and a breaking point of at least 10 degrees C.

4. The insulating felt, according to claim 1, wherein the pyrolytic resin is prepared by pyrolysis of petrol and has a softening point of 60 to 90 degrees C.

5. The insulating felt, according to claim 1, wherein said fine-grained material has a grain size of 100 to 200μ.

6. The insulating felt, according to claim 1, wherein said reinforcing material is textile glass or polymer cloth having a fiber-fineness of at least 0.2 mm. and a space among the fibers of at most 4 mm$^2$.

* * * * *